(12) United States Patent
Smyly et al.

(10) Patent No.: US 6,629,586 B2
(45) Date of Patent: Oct. 7, 2003

(54) METHOD AND APPARATUS FOR BRAKING VEHICLE

(75) Inventors: Steven D. Smyly, Griffin, GA (US); Ned R. Welch, Ellenwood, GA (US)

(73) Assignee: Snapper, Inc., McDonough, GA (US)

( * ) Notice: Subject to any disclaimer, the term of this patent is extended or adjusted under 35 U.S.C. 154(b) by 0 days.

(21) Appl. No.: 09/837,250

(22) Filed: Apr. 18, 2001

(65) Prior Publication Data

US 2001/0029801 A1 Oct. 18, 2001

Related U.S. Application Data

(60) Provisional application No. 60/197,719, filed on Apr. 18, 2000.

(51) Int. Cl.[7] ................................................. F16P 65/14
(52) U.S. Cl. ..................................... 188/106 R; 188/10
(58) Field of Search ....................... 188/9, 10, 106 R, 188/18 R

(56) References Cited

U.S. PATENT DOCUMENTS

| | | |
|---|---|---|
| 513,394 A | 1/1894 | Hays |
| 1,098,300 A | 5/1914 | Prather |
| 1,222,839 A | 4/1917 | Wright |
| 1,396,965 A | 11/1921 | Lucand |
| 1,535,092 A | 4/1925 | Bell |
| 1,538,677 A | 5/1925 | Birkigt |
| 1,547,133 A | 7/1925 | Strickland |
| 1,645,846 A | 10/1927 | Andres |
| 1,788,861 A | 1/1931 | Crawford |
| 1,795,719 A | 5/1931 | Hardison |
| 1,805,274 A | 5/1931 | Anderson |
| 1,873,906 A | 8/1932 | Ring et al. |
| 1,877,385 A | 9/1932 | Casaletto |
| 1,907,876 A | 6/1933 | Rockwell |
| 1,912,778 A | 6/1933 | La Brie |
| 1,930,032 A * | 10/1933 | Apple .................... 188/106 R |
| 1,996,332 A | 4/1935 | Grinslade |
| 2,174,464 A * | 9/1939 | Givens .................... 188/10 |
| 2,873,820 A | 2/1959 | Rizzuto |
| 3,398,813 A | 8/1968 | Pontani |
| 3,508,454 A | 4/1970 | Fanslow et al. |
| 4,086,824 A | 5/1978 | Johnson |
| 4,248,331 A | 2/1981 | Behrens |
| 4,298,108 A | 11/1981 | Hutchison |
| 4,496,035 A | 1/1985 | Wanie |
| 4,759,417 A | 7/1988 | Wanie et al. |
| D301,128 S | 5/1989 | Simon |
| 4,883,137 A | 11/1989 | Wanie et al. |
| D305,519 S | 1/1990 | Crookes et al. |
| D311,921 S | 11/1990 | Popelier et al. |
| 4,969,533 A | 11/1990 | Holm et al. |
| 5,022,477 A | 6/1991 | Wanie |
| 5,096,032 A | 3/1992 | Hutchison et al. |
| 5,152,382 A | 10/1992 | Hoch et al. |
| 5,315,893 A | 5/1994 | Behrens et al. |

* cited by examiner

*Primary Examiner*—Matthew C. Graham
(74) *Attorney, Agent, or Firm*—Alston & Bird LLP

(57) ABSTRACT

A brake assembly is provided for use with a utility vehicle. The brake assembly includes a mechanism including a pair of compression springs configured to provide the ability of one brake to be further applied after one brake has been completely applied. A parking brake is also provided which includes a ratcheting feature.

23 Claims, 4 Drawing Sheets

METHOD AND APPARATUS FOR BRAKING VEHICLE

CROSS-REFERENCE TO RELATED APPLICATION

The present application claims the full benefit and priority to pending provisional U.S. patent application Ser. No. 60/197,709, filed Apr. 18, 2000, and incorporates the entirety of said provisional application into the present non-provisional application.

TECHNICAL FIELD

The present invention relates generally to utility vehicles, and particularly relates to a utility vehicle brake system and method of using same.

BACKGROUND OF THE INVENTION

It is generally known in the art to provide vehicles for use in transporting humans and materials. Such vehicles can be in the form of off-road utility vehicles, which can be used to assist in the provision of a variety of tasks.

Such utility vehicles typically include a need for a braking system in order to bring the vehicle to a stop or to maintain the vehicle at a stop.

A variety of braking systems are known in the art for such utility vehicles with a braking capability.

Although some of the above prior art configurations have advantages, a need for improvement always exists.

Therefore, it may be recognized that the present invention provides an improvement over the prior art by providing an improved braking system for a utility vehicle.

SUMMARY OF THE INVENTION

The present invention overcomes deficiencies in the prior art by providing an improved braking system for use with a utility vehicle, which is simple yet effective in design.

Generally described, the present invention relates to a braking apparatus for use with a utility vehicle having a frame, a brake pedal and first and second brake assemblies, the braking apparatus comprising; an elongate pivoting shaft having a longitudinal axis, the shaft being pivotably mounted relative to the frame, the pivoting being substantially about the longitudinal axis of the shaft; at least one brake pedal linkage intermediate the brake pedal and the elongate shaft such that the operation of the brake pedal causes pivoting of the shaft; first and second fixed brackets rigidly fixed relative to the shaft such that pivoting of the shaft causes pivoting of the first and second fixed brackets relative to the frame; first and second pivoting brackets independently pivotably attached relative to the shaft and thus also pivotably mounted relative to the frame; first and second compression springs, the first compression spring intermediate the first fixed bracket and the first pivoting bracket, and the second compression spring intermediate the second fixed bracket and the second pivoting bracket; first and second compression spring precompression and retaining members for maintaining the first and second compression springs in a precompressed state; at least one first brake linkage member intermediate the first pivoting bracket and the first brake assembly, the linkage configured such that pivoting of the first pivoting bracket relative to the frame causes operation of the first brake assembly; and at least one second brake linkage member intermediate the second pivoting bracket and the second brake member, the linkage configured such that pivoting of the second pivoting bracket relative to the frame causes operation of the second brake member, such that operation of the brake pedal causes movement of the brake pedal linkage member, which causes pivoting movement of the pivoting shaft, which causes pivoting movement of the first and second fixed brackets, which transfer force through the first and second precompressed compression springs to the first and second pivoting brackets, which causes the first and second pivoting brackets to pivot relative to the shaft and the frame, which causes the first and second brake assemblies to be operated.

Therefore it is an object of the present invention to provide an improved braking assembly for use with vehicles.

It is a further object of the present invention to provide an improved braking assembly for use with vehicles which is simple in construction.

It is a further object of the present invention to provide an improved braking assembly for use with vehicles which is simple in operation.

It is a further object of the present invention to provide an improved braking assembly for use with vehicles which is simple in assembly.

It is a further object of the present invention to provide an improved braking assembly for use with vehicles which is reliable in construction.

It is a further object of the present invention to provide an improved braking mechanism including springs configured to provide the ability of one brake to be further applied after one brake has been completely applied.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Reference is now made to the drawings, in which like numerals indicate like elements throughout the several views.

Figure 1:
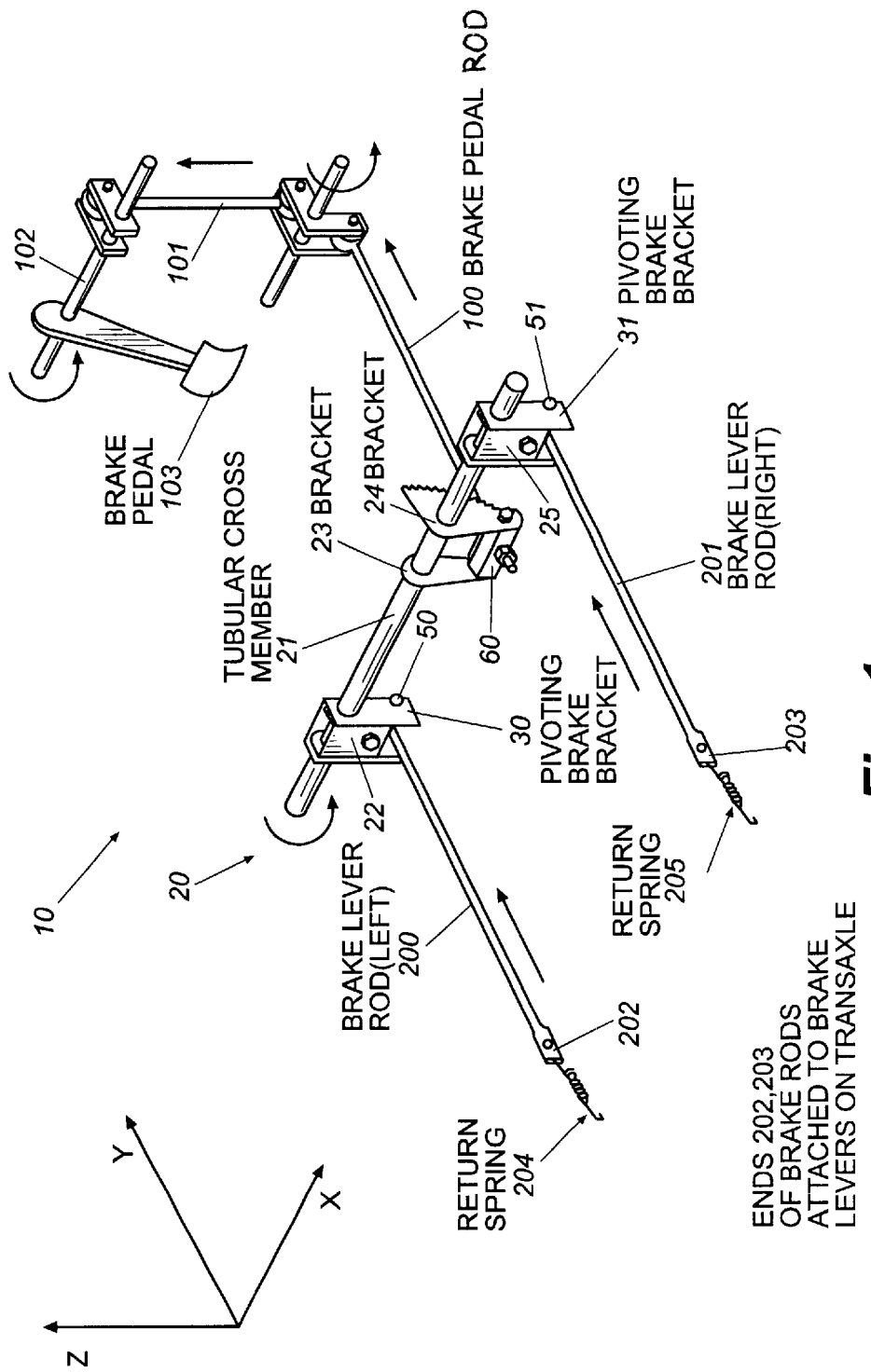
FIG. 1 shows an overall perspective view of a portion of a brake assembly 10 according to the present invention.

Reference is first made to FIG. 1, which is a pictorial view of a portion of the overall braking system 10.

For purposes of explanation, the apparatus 10 will be assumed to be operating in a three dimensional environment oriented relative to three mutually perpendicular axes, Axis X, Axis Y, and Axis Z which are also shown in FIG. 1. Axis Y may be understood to be generally horizontal and generally parallel to the direction of travel of the vehicle as it is travelling in a forward direction, which is generally parallel to Axis Y. Axis Z is substantially vertical, and Axis X is horizontal and transverse to the travel of the vehicle.

Referring also to FIGS. 2–5, the braking apparatus 10 includes the following elements:
cross shaft assembly 20
   elongate tubular cross shaft member 21
   inner fixed brackets 23, 24
   outer fixed brackets 22 and 25
pivoting brake brackets 30, 31
compression springs 40, 41
brake lever swivels 50, 51
swivel retainer brackets 55, 56
brake pedal swivel 60
bolts 70
nuts 72
self tapping screws 74
brake pedal rod 100
brake pedal 103
brake lever rods 200, 201
parking brake cable 301
cable sheath 302
pawl 305
pawl return spring 310
ratchet spring 311

Cross Shaft Assembly 20

Figure 2:
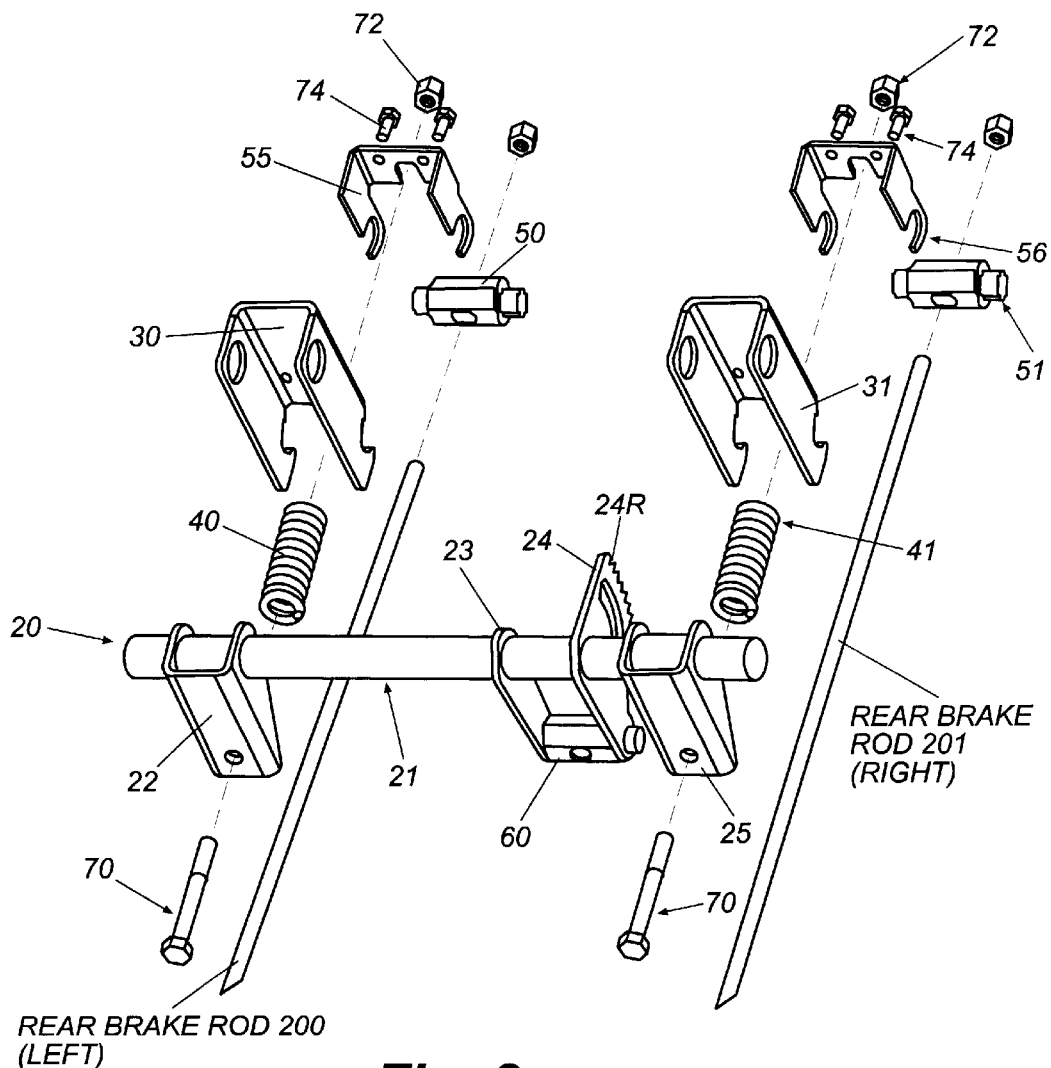
FIG. 2 shows an exploded view of a portion of the braking apparatus 10, namely the portion relating to the cross shaft assembly 20 which transfers force from the brake pedal rod (see FIG. 2) through swivel 60 to the two brake lo lever rods 200.

Referring now particularly to FIGS. 1 and 2, the cross shaft assembly 20 includes a generally tubular elongate cross shaft member 21 (a.k.a. elongate "pivoting shaft" 21) having four brackets 22, 23, 24, and 25 welded or otherwise fixed thereto.

The tubular elongate cross shaft member 21 is pivotably mounted relative to the frame of the overall utility vehicle such that it is free to pivot about its center longitudinal axis relative to the utility vehicle frame as noted in more detail below. Such a pivoting connection is provided by suitable bearings (not shown). The longitudinal axis of the elongate cross shaft member lies substantially along the X axis. It should also be noted that said pivoting could be considered rotation, albeit partial rotation, about the longitudinal axis.

Outer fixed brackets 22 and 25 are welded or otherwise fixed to tubular elongate cross shaft member 21 proximate its ends. In one embodiment these brackets are sheet metal stampings. Each of the two parallel flanges of the outer brackets 22 and 25 defines a corresponding hole, which has a bore aligned substantially along the "X" axis, while fits around the circumference of the tubular elongate cross shaft member 21 to allow them to be fixed thereto by tack welding or the like.

The outer fixed brackets 22, 25 are tapered to allow some pivoting of brackets 30, 31, as described elsewhere.

The inner brackets 23, 24, are welded to tubular elongate cross shaft member 21, and likewise each defines a hole lying along a common axis substantially along the "Y" axis, again allowing them to be slid onto the shaft 21 prior to welding. These inner brackets 23, 24 combine to provide a pivoting mount for a brake pedal swivel 60. One of inner brackets 24 also includes a ratchet portion 24R, the operation of which is described in more detail later with respect to the parking brake assembly.

Although the cross shaft member is shown as tubular, it could of course be solid.

Independent Brake Brackets 30, 31

The pivoting brake brackets 30, 31 are similar in configuration, and each includes what could be thought of as a main planar portion having two planar side flange portions extending perpendicularly from the main planar portion to provide a U-shaped channeled cross section. The main planar portion includes a through hole for accepting a bolt as discussed later, and the two planar side flange portions each includes a through hole configured to pivotably accept the tubular elongate cross shaft member 21, such that the pivoting brake brackets 30 are configured to be pivotably mounted relative to the cross shaft assembly 20, with the elongate tubular cross shaft member 21 passing through the two holes in the bracket 30.

It should be understood that during factory assembly of the cross shaft assembly 20, the pivoting brake brackets 30, 31 and the outer fixed brackets 22 and 25 will need to be "threaded" onto the shaft 21 at the same time, with the brackets 22, 25 being nestled within their corresponding brackets 30, 31 with their channel cavities being cofacing. Once said brackets are located on the shaft, the outer fixed brackets 22 and 25 can then be welded or otherwise attached to the shaft 21.

Compression Springs 40

A pair of compression springs 40, 41, are used. The compression springs 40, 41, are configured to be captured intermediate a corresponding one of the outer fixed brackets 22, 25 and a corresponding one of the pivoting brake brackets 30, 31. Specifically, compression spring 40 is captured intermediate the outer fixed bracket 22 and the pivoting bracket 30, and compression spring 41 is captured intermediate the outer fixed bracket 24 and the pivoting bracket 31.

Independent Brake Lever Swivels 50

Two independent brake lever swivels 50, 51 are used. Each of the swivels is substantially similar to the, brake pedal brake swivel 60, in that they include a smooth through bore and opposing coaligned stub shafts.

The brake lever swivels 50, 51 are similar in operation. As example, brake lever swivel 50, is captured in forwardly-oriented slots of pivoting brake bracket 30 by a swivel retainer bracket 55, which is attached by self tapping screws 74 to bracket 30, Similarly, brake lever swivel 51 is captured in the slots of pivoting brake bracket 31 by a swivel retainer bracket 50, which is also attached by self tapping screws 74 to bracket 31.

Retaining Brackets 55, 56

Retaining brackets 55,56 are associated with the pivoting brake brackets 30, 31, respectively, and are configured to combine with associated brake brackets 30, 31 capture the brake lever swivels 50, 51, respectively. Retaining bracket 55 is detachably attached to pivoting brake bracket 30 by fasteners as known in the art (e.g., self tapping screws 74) such that these elements 55, 30, combine to capture swivel 50 while allowing the swivel 50 to pivot about an axis parallel to the X axis. This pivoting is done within a pair of holes defined by the combination of cofacing slots defined by the bracket 30 and the bracket 55. Similarly, retaining bracket 56 is detachably attached to pivoting brake bracket 31 by fasteners as known in the such that these elements 56, 31, combine to capture swivel 51 while allowing the swivel 51 to pivot about an axis parallel to the X axis. As noted elsewhere, the swivels 50, 51 are attached proximate the front ends of the brake rods 200, 201, respectively.

Brake Pedal Swivel 60

The brake pedal swivel 60 includes a smooth through bore, transverse to its pivoting and longitudinal axis which is configured to accept the rear end of the brake pedal rod 100, with the brake pedal swivel 60 being retained on the rear end of the brake pedal rod 100 by use of a retaining nut or other suitable fastener. The brake pedal swivel 60 also includes two opposing stub shafts (a.k.a. cylindrical bosses) which lie along a common axis which lies substantially along the X axis. Each of these opposing stub shafts is configured to rotatably fit within a corresponding hole in the inner brackets 23, 24. Assembly is done by welding the inner brackets in place after the swivel is suitably positioned.

Bolt/Nut Combination 70/72

Each of the two nuts 70 threadably cooperates with a corresponding one of the two bolts 72. As an example, one threaded bolt 70 passes through a hole in the fixed bracket 22, through the longitudinal bore of the spring 40, through the hole in the brake lever swivel 50, and finally threadably engages a nut 72.

As the nut 72 is threaded down the threaded bolt 70, the fixed bracket 22, spring 40 and brake lever swivel 50 tend to be captured between the nut and the head of the bolt, and the spring tends to be compressed. This provides a preloading feature which is typically set once during factory assembly. The farther 20 the nuts are tightened down on the bolts, the greater the corresponding springs are preloaded.

Assembly of Braking Apparatus 10

When the braking apparatus 10 is assembled, each bolt 70 passes through a corresponding bracket (22 or 25), a compression spring (40 or 41), a swivel (50 or 51), and is captured at its threaded end by a corresponding nut 72.

When tightened to a suitable state, the bolt/nut assembly captures the compression spring intermediate the lower end of the bracket (e.g. 22) and the lower end of the bracket (e.g. 30).

It should be understood that under such a configuration, the lower ends of the brackets 22, 30 can be squeezed together (against the opposing spring force) but cannot be moved apart beyond that limited by the nut/bolt combination 70/72.

Brake Pedal Rod 100

The brake pedal rod 100 pulls on the swivel 60, and is configured to be moved forward when the brake pedal 103 is depressed, and rearward when the brake pedal 103 is released. In one configuration, The brake return springs do all the returning.

Brake Lever Rods 200

The brake lever rods 200, 201 are pulled forward by the independent brake pivoting brake brackets 30, 31, respectively, and operate corresponding left and right brake assemblies (not shown), which are conventional.

Therefore it may be seen that the operation of the brakes is somewhat independent, in that one brake may be further applied although the other brake may be completely applied.

Overall Operation

The brake pedal 103 is configured to be conventionally operated by an operator's foot (not shown), such that the shaft 102 rotates and various linkages including rod 101 cause the brake pedal rod 100 to be moved forwardly in the direction shown by the associated arrow. As the brake pedal swivel 60 is attached proximate the rear end of the brake pedal rod 100, this pulls the lower ends of the inner brackets 23, 24 forwardly, causing the elongate cross shaft member 21 to rotate in the direction shown by the associated curved arrow in FIG. 1, in a generally counterclockwise direction as FIG. 1 is viewed. This causes the fixed brackets 22 and 25 likewise to rotate in a generally counterclockwise direction as FIG. 1 is viewed. This causes the compression springs 40, 41 to transfer corresponding force to their associated pivoting brake brackets 30, 31. As the brake lever swivels 50, 51, are captured at the lower ends of the associated pivoting brake brackets 30, 31, this causes the forward ends of the brake lever rods 200, 201 to be drawn forwardly in the directions shown by the associated arrows. Such movement of the brake lever rods 200 causes brake engagement of the brake assemblies 1200, 1201 of FIG. 4, thus braking rear wheels such as 2200, 2201.

It should be understood that during such operation, should one of the brakes engage earlier than the other, that brake's corresponding compression spring will compress to allow the other brake rod to continue its forward travel.

Parking Brake

The apparatus according to the present invention includes a parking brake feature. This parking brake feature allows an operator to engage both brakes of the vehicle by a hand action, such that said brakes remain engaged and the operator can leave the vehicle with the brakes engaged. The operator can then manually disengage the brakes such that they can be operated normally.

To operate the brakes, the operator can use a hand lever or other suitable operating member. In one embodiment hand lever is used which is configured to move within a "J"-shaped slot and to be selectively placed in either end of the "J"-shaped slot.

Figure 3:
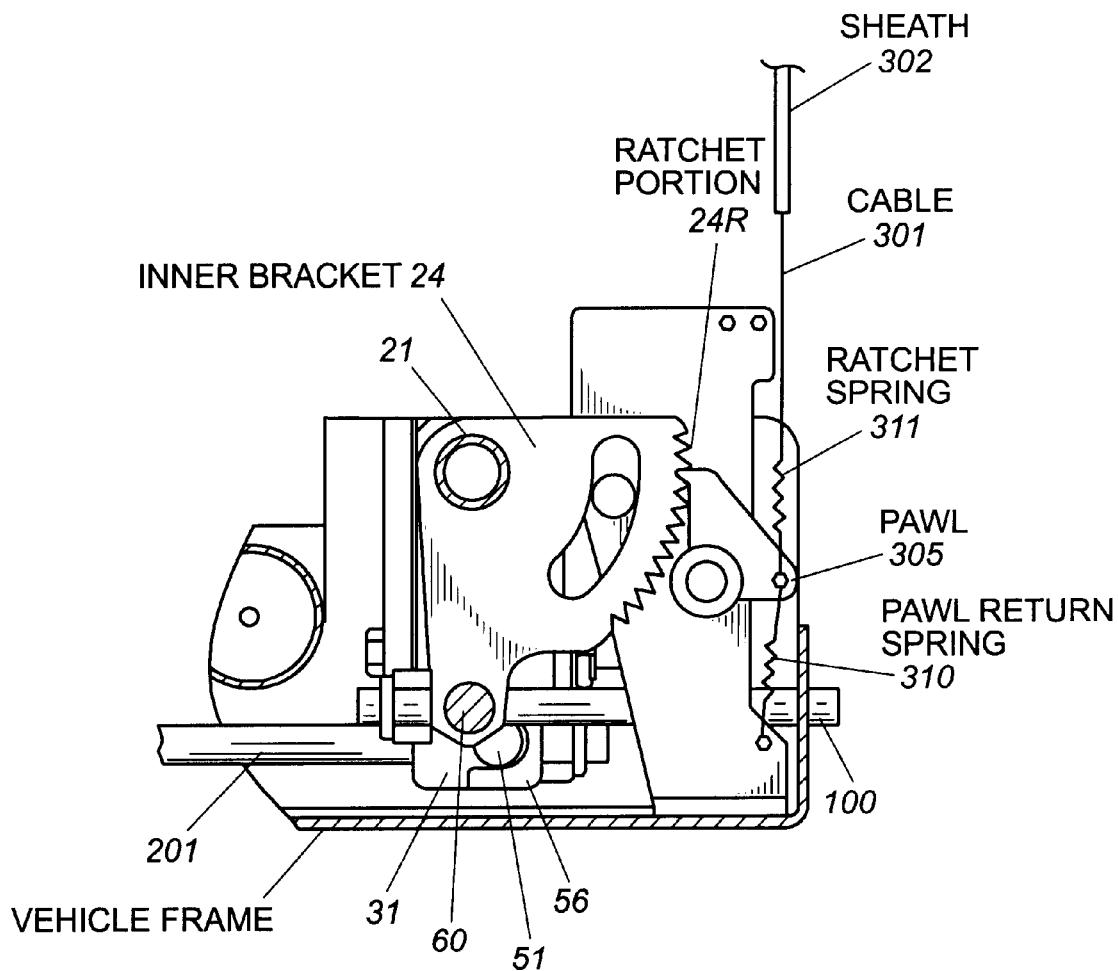
FIG. 3 shows a parking brake assembly portion of the brake apparatus 10, relating to a brake ratchet 24R and brake pawl 305.
Figure 4:
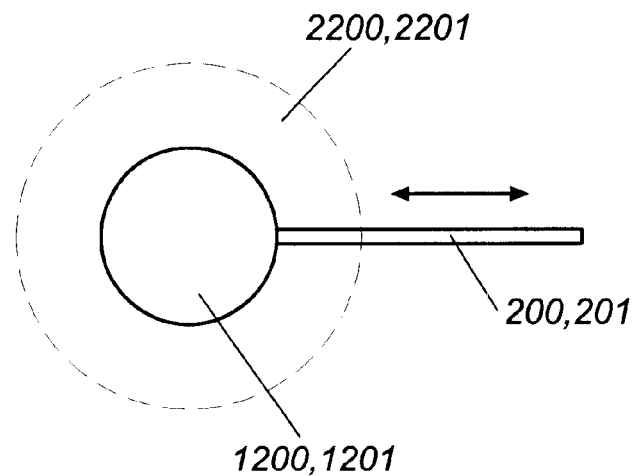
FIG. 4 is an illustrative view of the operation of conventional brake assemblies 1200, 1201, which are operated by brake lever rods 200, 201, and which provide a brake function to conventional wheels such as 2200, 2201.
Figure 5:
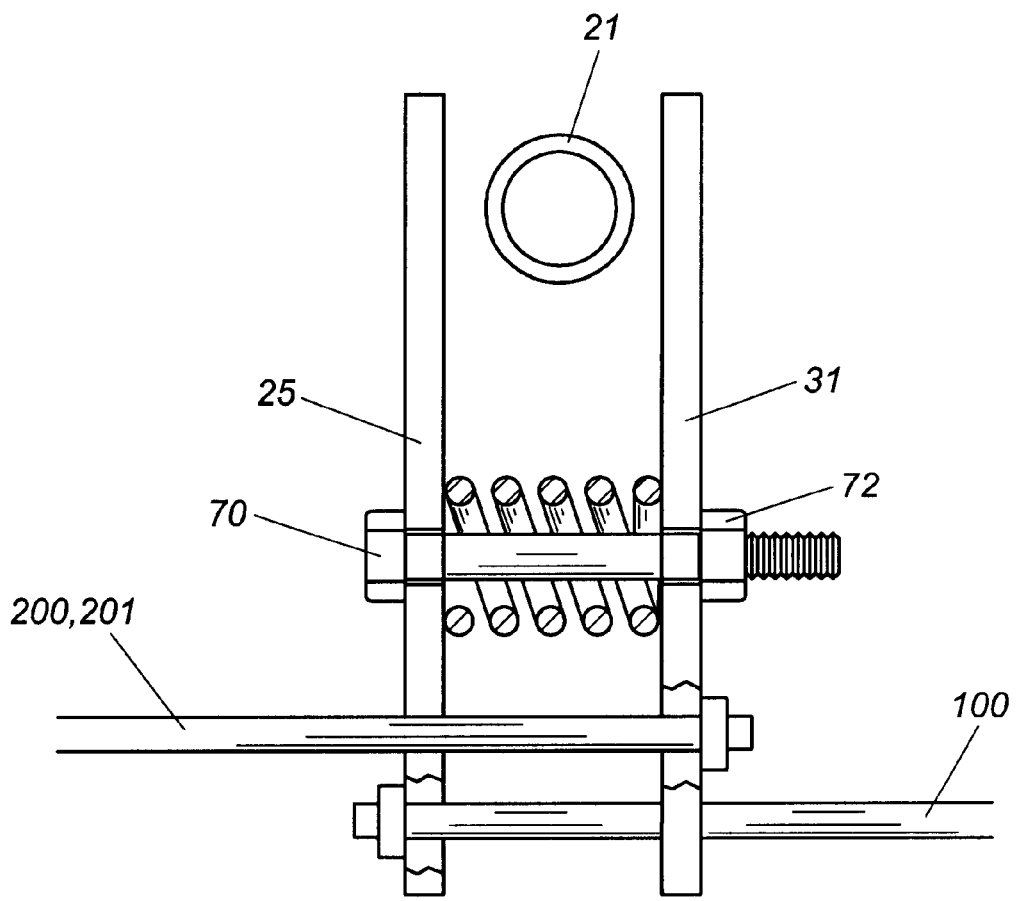
FIG. 5 is an illustrative view of a portion of the braking assembly according to the present invention which can be used to understand basic interaction of various elements, and is not to scale.

The parking brake lever is configured to operate a flexible sheathed cable which is configured to operate the assembly shown in FIG. 3.

To engage the parking brake, a parking lever is moved into its engaged position, which causes the cable 301 to move up (as FIG. 3 is viewed) such that the pawl 305 is in the engaged position shown in FIG. 3. When in the position shown in FIG. 3, the parking brake pawl 305 is engaged with the ratchet portion 24R of the inner bracket 24 discussed above. The operator then presses on the brake pedal with the foot, such that the inner bracket 24 moves counterclockwise as the inner bracket 24 pivots and the brake pawl 90 engages the ratchet portion. The engagement of the ratchet portion 24R and the pawl 90 allow the brake to be set at the desired level while a "racheting" action is provided.

To release the brake, the parking brake lever 300 is unlatched and the lever is moved forward to the unlatched position. The brake pawl 90 at this point is still engaged with the ratchet portion 24R due to the binding effect of the brakes. The brake pedal is then pushed such that the inner bracket 24 rotates slightly counterclockwise, thus allowing the brake pawl 305 to pivot clockwise (due to the force of pawl return spring 310) to unlock the brake. The brake pedal can then be released and normal braking may be resumed.

Alternatives

It should be noted that several alternatives may be available under the present invention. This includes the use of sheathed cables instead of solid rods as "linkages", and also includes the possibility that other types of springs (such as torsion springs or tensile springs) could be used as an alternative to the compression springs in order to provide the spring action between the fixed brackets and their associated pivoting brackets. Instead of the "nesting" of the fixed brackets within the pivoting brackets, the opposite is also contemplated.

CONCLUSION

While this invention has been described in specific detail with reference to the disclosed embodiments, it will be understood that many variations and modifications may be effected within the spirit and scope of the invention as described in the appended claims.

What is claimed is:

1. A braking apparatus for use with a utility vehicle having a frame, a brake pedal and first and second brake assemblies, said braking apparatus comprising:

an elongate pivoting shaft having a longitudinal axis, said shaft being pivotably mounted relative to said frame, said pivoting being substantially about the longitudinal axis of said shaft;

at least one brake pedal linkage intermediate said brake pedal and said elongate shaft such that the operation of said brake pedal causes pivoting of said shaft;

first and second fixed brackets rigidly fixed relative to said shaft such that pivoting of said shaft causes pivoting of said first and second fixed brackets relative to said frame;

first and second pivoting brackets independently pivotably attached relative to said shaft and thus also pivotably mounted relative to said frame;

first and second compression springs, said first compression spring intermediate said first fixed bracket and said first pivoting bracket, and said second compression spring intermediate said second fixed bracket and said second pivoting bracket;

first and second compression spring precompression and retaining members for maintaining said first and second compression springs in a precompressed state;

at least one first brake linkage member intermediate said first pivoting bracket and said first brake assembly, said linkage configured such that pivoting of said first pivoting bracket relative to said frame causes operation of said first brake assembly; and at least one second brake linkage member intermediate said second pivoting bracket and said second brake assembly, said linkage configured such that pivoting of said second pivoting bracket relative to said frame causes operation of said second brake assembly, such that operation of said brake pedal causes movement of said brake pedal linkage, which causes pivoting movement of said pivoting shaft, which causes pivoting movement of said first and second fixed brackets, which transfer force through said first and second precompressed compression springs to said first and second pivoting brackets, which causes said first and second pivoting brackets to pivot relative to said shaft and said frame, which causes said first and second brake assemblies to be operated.

2. The braking apparatus as claimed in claim 1, wherein said first and second compression spring precompression and retaining members are elongate double-headed members.

3. The braking apparatus as claimed in claim 2, wherein said first and second compression spring precompression and retaining members pass though said first and second compression springs, respectively.

4. The braking apparatus as claimed in claim 3, further comprising a parking brake locking member attached to said shaft such that said parking brake member pivots with said shaft, wherein fixing of said parking brake locking member in a certain position can provide a parking brake function.

5. The braking apparatus as claimed in claim 2, further comprising a parking brake locking member attached to said shaft such that said parking brake member pivots with said shaft, wherein fixing of said parking brake locking member in a certain position can provide a parking brake function.

6. The braking apparatus as claimed in claim 1, further comprising a parking brake locking member attached to said shaft such that said parking brake member pivots with said shaft, wherein fixing of said parking brake locking member in a certain position can provide a parking brake function.

7. The braking apparatus as claimed in claim 1, wherein each of said first and second fixed brackets is elongate and has one end fixed relative to said shaft, and wherein each of said first and second pivoting brackets is elongate and has one end pivotably attached relative to said shaft.

8. A braking apparatus for use with a utility vehicle having a frame, a brake pedal and first and second brake assemblies, said braking apparatus comprising:

an elongate pivoting shaft having a longitudinal axis, said shaft being pivotably mounted relative to said frame, said pivoting being substantially about the longitudinal axis of said shaft;

at least one brake pedal linkage intermediate said brake pedal and said elongate shaft such that the operation of said brake pedal causes pivoting of said shaft;

first and second fixed brackets rigidly fixed relative to said shaft such that pivoting of said shaft causes pivoting of said first and second fixed brackets relative to said frame;

first and second pivoting brackets independently pivotably attached relative to said shaft and thus also pivotably mounted relative to said frame;

first and second springs, said first spring intermediate said first fixed bracket and said first pivoting bracket, and said second spring intermediate said second fixed bracket and said second pivoting bracket;

at least one first brake linkage member intermediate said first pivoting bracket and said first brake assembly, said linkage configured such that pivoting of said first pivoting bracket relative to said frame causes operation of said second brake assembly; and at least one second brake linkage member intermediate said second pivoting bracket and said second brake assembly, said linkage configured such that pivoting of said second pivoting bracket relative to said frame causes operation of said second brake assembly, such that operation of said brake pedal causes movement of said brake pedal linkage, which causes pivoting movement of said pivoting shaft, which causes pivoting movement of said first and second fixed brackets, which transfer force through said first and second springs to said first and second pivoting brackets, which causes said first and second pivoting brackets to pivot relative to said shaft and said frame, which causes said first and second brake assemblies to be operated.

9. The braking apparatus as claimed in claim 8, wherein said first and second compression spring precompression and retaining members are elongate double-headed members.

10. The braking apparatus as claimed in claim 9, wherein said first and second compression spring precompression and retaining members pass though said first and second compression springs, respectively.

11. The braking apparatus as claimed in claim 8, further comprising a parking brake locking member attached to said shaft such that said parking brake member pivots with said shaft, wherein fixing of said parking brake locking member in a certain position can provide a parking brake function.

12. The braking apparatus as claimed in claim 8, wherein each of said first and second fixed brackets is elongate and has one end fixed relative to said shaft, and wherein each of said first and second pivoting brackets is elongate and has one end pivotably attached relative to said shaft.

13. A braking apparatus for use with a utility vehicle having a frame, a brake pedal and first and second brake assemblies, said braking apparatus comprising:

an elongate pivoting shaft having a longitudinal axis, said shaft being pivotably mounted relative to said frame, said pivoting being substantially about the longitudinal axis of said shaft;

at least one brake pedal linkage intermediate said brake pedal and said elongate shaft such that the operation of said brake pedal causes pivoting of said shaft;

first and second fixed brackets rigidly fixed relative to said shaft such that pivoting of said shaft causes pivoting of said first and second fixed brackets relative to said frame;

first and second pivoting brackets independently pivotably attached relative to said shaft and thus also pivotably mounted relative to said frame, said first and second pivoting brackets captured from moving axially along said shaft by the presence of said first and second fixed brackets, respectively;

first and second springs, said first spring intermediate said first fixed bracket and said first pivoting bracket, and said second spring intermediate said second fixed bracket and said second pivoting bracket;

at least one first brake linkage member intermediate said first pivoting bracket and said first brake assembly, said linkage configured such that pivoting of said first pivoting bracket relative to said frame causes operation of said first brake assembly;

at least one second brake linkage member intermediate said second pivoting bracket and said second brake assembly, said linkage configured such that pivoting of said second pivoting bracket relative to said frame causes operation of said second brake assembly;

such that operation of said brake pedal causes movement of said brake pedal linkage, which causes pivoting movement of said pivoting shaft, which causes pivoting movement of said first and second fixed brackets, which transfer force through said first and second springs to said first and second pivoting brackets, which causes said first and second pivoting brackets to pivot relative to said shaft and said frame, which causes said first and second brake assemblies to be operated.

14. The braking apparatus as claimed in claim 13, wherein each of said pivoting brackets defines two coxially-aligned holes, each of said holes sized to accept said substantially round transverse cross-section of said shaft.

15. The braking apparatus as claimed in claim 14, wherein one of said pivoting brackets nests within or about one of said fixed brackets.

16. The braking apparatus as claimed in claim 13, wherein said first and second compression spring precompression and retaining members are elongate double-headed members.

17. The braking apparatus as claimed in claim 16, wherein said first and second compression spring precompression and retaining members pass though said first and second compression springs, respectively.

18. The braking apparatus as claimed in claim 13, further comprising a parking brake locking member attached to said shaft such that said parking brake member pivots with said shaft, wherein fixing of said parking brake locking member in a certain position can provide a parking brake function.

19. The braking apparatus as claimed in claim 13, wherein each of said first and second fixed brackets is elongate and has one end fixed relative to said shaft, and wherein each of said first and second pivoting brackets is elongate and has one end pivotably attached relative to said shaft.

20. A method of manufacturing and then using a braking apparatus for use with a utility vehicle having a frame, a brake pedal and first and second brake assemblies, said method comprising the steps of:

providing an elongate pivoting shaft having a longitudinal axis and a substantially round transverse cross-section;

providing first and second fixed brackets each with at least one hole therein, each said hole sized to accept said substantially round transverse cross-section of said shaft;

providing first and second pivoting brackets each with at least one hole therein, each said hole sized to accept said substantially round transverse cross-section of said shaft;

threading said first and second fixed brackets and also threading said first and second pivoting brackets on said elongate shaft such that said shaft extends through said holes in all of said first and second fixed brackets and said first and second pivoting brackets;

fixing said first and second fixed brackets rigidly relative to said shaft such that pivoting of said shaft causes pivoting of said first and second fixed brackets relative to said frame, and such that said first and second fixed brackets axially capture and limit the axial movement of said first and second pivoting brackets along the longitudinal axis of said shaft, but said first and second pivoting brackets are still allowed to pivot about the longitudinal axis of said shaft relative to said shaft and said fixed brackets;

attaching first and second springs within said braking apparatus, said first spring intermediate said first fixed bracket and said first pivoting bracket, and said second spring intermediate said second fixed bracket and said second pivoting bracket;

pivotably mounting said elongate shaft relative to said frame, such that said elongate shaft and said first and second fixed brackets can also pivot relative to said frame substantially about the longitudinal axis of said shaft, and such that said first and second pivoting brackets are pivotably movable about said longitudinal axis of said shaft relative to said first and second fixed brackets as well as relative to said shaft;

providing at least one brake pedal linkage intermediate said brake pedal and said elongate shaft such that the operation of said brake pedal causes pivoting of said shaft;

attaching at least one first brake linkage member intermediate said first pivoting bracket and said first brake assembly, said linkage configured such that pivoting of said first pivoting bracket relative to said frame causes operation of said first brake assembly; and attaching at least one second brake linkage member intermediate said second pivoting bracket and said second brake assembly, said linkage configured such that pivoting of said second pivoting bracket relative to said frame causes operation of said second brake assembly, such that operation of said brake pedal causes movement of said brake pedal linkage, which causes pivoting movement of said pivoting shaft, which causes pivoting movement of said first and second fixed brackets, which transfer force through said first and second springs to said first and second pivoting brackets, which causes said first and second pivoting brackets to pivot relative to said shaft and said frame, which causes said first and second brake assemblies to be operated.

21. The braking apparatus as claimed in claim 20, wherein said first and second compression spring precompression and retaining members are elongate double-headed members.

22. The braking apparatus as claimed in claim 21, wherein said first and second compression spring precompression and retaining members pass though said first and second compression springs, respectively.

23. The braking apparatus as claimed in claim 20, further comprising a parking brake locking member attached to said shaft such that said parking brake member pivots with said shaft, wherein fixing of said parking brake locking member in a certain position can provide a parking brake function.

* * * * *